(12) United States Patent
Aisthorpe et al.

(10) Patent No.: US 8,919,287 B2
(45) Date of Patent: Dec. 30, 2014

(54) HOUSING FOR ANIMAL FEEDSTUFF

(76) Inventors: Stephen Aisthorpe, New South Wales (AU); David Kay, Queensland (AU)

(*) Notice: Subject to any disclaimer, the term of this patent is extended or adjusted under 35 U.S.C. 154(b) by 4 days.

(21) Appl. No.: 12/972,784

(22) Filed: Dec. 20, 2010
(Under 37 CFR 1.47)

(65) Prior Publication Data
US 2011/0180005 A1 Jul. 28, 2011

Related U.S. Application Data

(63) Continuation-in-part of application No. 11/587,996, filed as application No. PCT/AU2004/000545 on Apr. 28, 2004, now abandoned.

(51) Int. Cl.
*A01K 1/00* (2006.01)
*A01K 5/00* (2006.01)
*A01K 5/01* (2006.01)

(52) U.S. Cl.
CPC ............... *A01K 5/01* (2013.01); *A01K 5/0107* (2013.01)
USPC .......................... 119/61.1; 119/63; 119/61.31

(58) Field of Classification Search
USPC .......... 119/61.1–61.3, 61.55, 61.31, 64, 57.8, 119/51.01, 51.03, 62
See application file for complete search history.

(56) References Cited

U.S. PATENT DOCUMENTS

| | | | | |
|---|---|---|---|---|
| 395,490 A * | 1/1889 | French | ........................ | 119/51.5 |
| 405,260 A * | 6/1889 | Jacobs | ........................ | 119/61.3 |
| 629,726 A * | 7/1899 | Stitzer | ........................ | 119/412 |
| 1,148,873 A * | 8/1915 | Stocking | ........................ | 119/61.3 |
| 1,561,299 A * | 11/1925 | Banks | ........................ | 119/52.1 |
| 1,906,016 A * | 4/1933 | Stecher | ........................ | 119/61.3 |
| D120,852 S * | 6/1940 | Bishop | ........................ | D30/124 |
| 2,638,872 A * | 5/1953 | Potter | ........................ | 119/61.31 |
| 2,933,062 A | 4/1960 | Geerlings | | |
| 2,988,047 A * | 6/1961 | Hurdle | ........................ | 119/52.4 |
| 4,192,107 A | 3/1980 | Wickstorm et al. | | |
| 5,205,241 A | 4/1993 | Halpin et al. | | |
| 5,554,248 A * | 9/1996 | Payne | ........................ | 156/304.2 |
| 5,630,375 A * | 5/1997 | Mann | ........................ | 119/51.03 |
| 5,680,829 A | 10/1997 | Payne | | |
| 8,181,600 B2 * | 5/2012 | Smith | ........................ | 119/60 |
| 2003/0005887 A1 | 1/2003 | Graham | ........................ | 119/52.1 |
| 2008/0257271 A1 * | 10/2008 | Aisthorpe et al. | ........................ | 119/61.55 |

FOREIGN PATENT DOCUMENTS

WO   WO 2006130915 A1 * 12/2006 ............ A01K 1/10

OTHER PUBLICATIONS

Australian Examination Report dated Sep. 1, 2011, issued in corresponding Australian Application No. AU 2011100889.
Australian Examination Report dated Sep. 28, 2011, issued in corresponding Australian Application No. AU 2011100889.
Australian Examination Report dated May 25, 2012, issues in corresponding Australian Application No. AU 2012201356.
Excerpt of 2003 Polymaster catalogue and accompanying price list.

* cited by examiner

*Primary Examiner* — Kristen C Hayes
(74) *Attorney, Agent, or Firm* — Stein IP LLC

(57) ABSTRACT

A housing for animal feedstuff including a base, a roof extending over the base, uprights spaced apart from one another and extending between the base and the roof, and a container locatable between the uprights for containing feedstuff. Livestock, such as cattle, access feedstuff within the container by way of spaces between the uprights. In an embodiment, the uprights are telescopic and the roof can be pivoted between raised and lowered positions relative to the uprights.

11 Claims, 6 Drawing Sheets

HOUSING FOR ANIMAL FEEDSTUFF

The application is a continuation-in-part of application Ser. No. 11/587,996, filed Oct. 30, 2006, which application is based upon international application PCT/AU2004/000545, filed Apr. 28, 2004.

This invention relates to a housing for animal feedstuff. In particular, the invention concerns a housing which protects feedstuff from wet weather.

The invention has been developed primarily for housing various forms of feedstuff for livestock (e.g. horses, cattle, goats and sheep) and will therefore be described in this context. It is to be appreciated, however, that the invention can be readily adapted to house feedstuff for other types of animals.

BACKGROUND OF THE INVENTION

A problem with some types of livestock-feeding containers, troughs and stations is that the feedstuff may not be adequately protected from wet weather. When feedstuff becomes wet, it usually spoils. In particular, when feedstuff containing urea is wetted, the urea converts to uric acid, and the feedstuff becomes toxic to livestock.

A further problem for farmers and stock-owners with respect to ensuring animals are appropriately fed relates to moving feeders from paddock to paddock. It is not feasible or necessary to have a feeder in all paddocks, feeders are only required in those paddocks where stock are currently placed. However, moving feeders, particularly large feeders, such as those required for horses and cattle, can be difficult.

Livestock producers thus have a genuine need for a covered feeder (to protect the feedstuff from wet weather) that is readily transportable.

The present inventors have now invented a housing for animal feedstuff which minimises the problems referred to above, or provides the public with a useful or commercial choice.

SUMMARY OF THE INVENTION

According to the present invention there is provided a housing for animal feedstuff, said housing including:
a base;
a roof extending over the base;
uprights spaced apart from one another and extending between the base and the roof; and
a container locatable between the uprights for containing feedstuff, wherein an animal accesses feedstuff within the container by way of spaces between the uprights.

DETAILED DESCRIPTION OF THE INVENTION

Preferably, the housing is suited for housing feedstuff for livestock ranging in size from larger livestock such as horses and cattle, to smaller livestock such as goats and sheep.

The roof can be of any suitable size, shape and construction. Preferably, the roof is in the form of a Chinaman's hat, being cone-shaped and overhanging the base. Extending the cone-shaped roof over the base, prevents the feed within the container from getting wet when it rains. The roof can have a pitch between about 15-40 degrees, but preferably about 30 degrees. The roof can be reinforced, for example, with radially extending ribs. An annular roof support member can extend beneath the roof. The annular roof support member can be circular pipe and can be connected to the roof in any suitable way. For instance, U-shaped bolts can be used to connect the roof to the annular roof support member.

The uprights can be of any suitable size, shape and construction. Each upright preferably comprises one or more pipes. Where an upright comprises more than one pipe, the pipes may be detachably connected, or they may be fixedly connected. The uprights can extend at any suitable angle relative to one another and to the base. The uprights can extend linearly and/or non-linearly from the base. The uprights can extend perpendicularly, inwardly and/or outwardly relative to the base.

The housing can have an annular upright support member connected to an upper end of each said upright. The annular upright support member can be a circular pipe.

The uprights can be of fixed length or of adjustable length. Preferably, the uprights are of adjustable length such that the roof can be raised or lowered relative to the base. Any means for adjusting the length of the uprights can be used. Preferably, each said upright comprises upper and lower telescopic halves, said upper telescopic half having a substantially vertically extending region and an arcuate region extending outwardly from an end of the vertically extending region to the annular upright support member, said lower telescopic half having a substantially vertically extending region and an arcuate region extending outwardly from an end of the vertically extending region to the base, and one said vertically extending region is slideable within the other said vertically extending region. Preferably, the upper and lower telescopic halves each comprise a pipe having a linear portion and an arcuate portion.

Any suitable locking means can be used to lock the upper and lower telescopic halves together such that the uprights are of the desired length. For instance, a latch bolt can be extended through aligned openings in the substantially vertically extending regions of the upper and lower telescopic halves. If desired, a sprung latch bolt can be used.

The roof can be detachably connected to the uprights or to the annular upright support member. The roof can be detachably connected in any suitable way. For instance, the roof can be connected to the annular upright support member with U-shaped bolts.

The roof can be pivoted between raised and lowered positions relative to the uprights. The roof can be pivoted in any suitable way. Preferably, the annular roof support member is pivotally connected to the annular upright support member for pivotal movement relative thereto. The roof can be pivoted to a raised position such that the container can be charged with feedstuff through the top of the housing between the annular members, thus allowing for easy re-filling of the feed container. In a particularly preferred embodiment, the roof can be pivoted about two opposing uprights such that the roof is tilted upwards at one point, thereby providing for easy access to the feed container for re-filling. In such an embodiment, an upright intermediate the two opposing uprights is collapsible by any suitable means to allow the roof to pivot about the two opposing uprights.

The base can be of any suitable size, shape and construction. The base can comprise, for instance, a ground-contacting annular member, such as a circular pipe. Preferably, there are four uprights that are spaced equidistantly around the base.

The housing can have a crosspiece extending between the uprights for supporting a base of the container. The crosspiece can be of any suitable size, shape and construction. Preferably, the crosspiece is X-shaped, having ends detachably connected to the uprights. The crosspiece can be detachably connected in any suitable way, e.g. using a clamp. Preferably, the position of the crosspiece with respect to the uprights can be adjusted, thereby enabling the height of the container to be adjusted to suit the height of the livestock to be fed.

The housing can have a container guard extending between the uprights and adjacent to an upper edge of the container. The guard can prevent the upper edge of the container from being deformed or destroyed by an animal. The guard can be of any suitable size, shape and construction. The guard is preferably annular and is a circular pipe. The guard can be connected to the uprights in any suitable way. Preferably, the guard is detachably connected by way of J-shaped bolts.

The housing can have a container support extending between the uprights and beneath a rim of the container. The container support can be of any suitable size, shape and construction. Preferably the container support is annular and is a circular pipe. The container support can be connected to the uprights in any suitable way. Preferably the container support is detachably connected by way of J-shaped bolts.

The container can be of any suitable size, shape and construction. The container can be used to contain liquid and/or solid feedstuff. Preferably, the container has a sloping sidewall such that it is nestable/stackable within a like container.

In one embodiment, the container has a base, a circular sloping sidewall extending from the base, and a rim extending around an upper edge of the sidewall. Such a container is suitable for containing feedstuff for horses and cattle.

In another embodiment, the container is in the form of a pot plant container and saucer, whereby feedstuff within the pot plant container flows into and fills the saucer. Such a container is suitable for containing feedstuff for goats. In this embodiment, an upper part of the container comprises a circular sloping sidewall and a rim extending from an upper edge of the sidewall, and a lower part of the container is spaced from the upper part of the container and comprises a base having a raised peripheral edge and a raised central portion that is either hemispherical or conical in shape.

The housing can have one or more skids connected to the base for moving the housing from one location to an other. The skids can be of any suitable size, shape and construction. The housing can have metal skids shaped much like a pair of skis.

The housing can have means for being anchored to the ground, and the anchoring means can be of any suitable size, shape and construction. Preferably, the anchoring means comprises a chain extending around the base, and a ground peg for securing the chain to the ground. This embodiment of the anchoring means allows for some movement of the housing, such that the base does not become embedded within the ground and begin to rust.

As mentioned, the housing can be made of any suitable material, such as galvanised metal. The roof can be made of any suitable material, such as galvanised sheet metal or plastics material (e.g. polyethylene).

Different parts of the housing can be welded together or detachably connected together. Preferably, the housing can be disassembled or partly disassembled for transport or storage in a compact form. Preferably, pieces of the housing are stackable with like pieces of other housings, such that multiple housings can be transported or stored in a compact form. For instance, a piece comprising the base together with one half of each upright can be stacked with a like piece of another housing. Another piece comprising the annular upright support member together with the other half of each upright can be stacked with a like piece of another housing and with the base piece. The container can be nested within a like container. The roof can be nested within a like roof of another housing. The container/s can be placed between the uprights, the roofs can be inverted and placed on the uprights. Thus, even though housings according to the present invention can be used to provide feed for large animals such as horses and cattle, they may be readily deconstructed into pieces which are stackable into a compact form and once stacked, are easily transportable.

In a particularly preferred form of the invention, there is provided a housing for animal feedstuff, said housing including:
an annular base;
a cone-shaped roof extending over the base;
an annular roof support member extending beneath the roof and connected to the roof so that the roof is able to maintain its cone shape when the housing is being transported or stored;
tubular uprights spaced apart from one another and connected to the annular base and the annular roof support member such that the roof is pivotable between raised and lowered positions relative to the uprights;
a container having a base and being locatable between the uprights for containing feedstuff, wherein an animal accesses feedstuff within the container by way of spaces between the uprights; and
a crosspiece extending between the uprights for supporting the container base above the annular base,
wherein the annular base, crosspiece and uprights when connected to one another as a single first piece are stackable with like first pieces of other housings like said housing such that the crosspieces are in contact with one another, the container is nestable with containers of other housings like said housing between the uprights of said first pieces, and the roof together with the annular roof support member are detachable from the uprights as a single second piece and nestable with like second pieces of other housings like said housing and are stackable atop or below the first pieces, such that said housings are transportable or storable in a compact form. An example of a tubular upright may comprise a circular pipe.

The invention also provides two or more housings in stacked conformation, wherein each housing includes:
an annular base;
a cone-shaped roof extending over the base;
an annular roof support member extending beneath the roof and connected to the roof so that the roof is able to maintain its cone shape when the housing is being transported or stored;
tubular uprights spaced apart from one another and connected to the annular base and the annular roof support member such that the roof is pivotable between raised and lowered positions relative to the uprights;
a container having a base and being locatable between the uprights for containing feedstuff, wherein an animal accesses feedstuff within the container by way of spaces between the uprights; and
a crosspiece extending between the uprights for supporting the container base above the annular base,
wherein the annular base, crosspiece and uprights of a housing are connected to one another as a single first piece and are stacked with like first pieces of other housings like said housing such that the crosspieces are in contact with one another, the container is nested with containers of other housings like said housing between the uprights of said first pieces, and the roof together with the annular roof support member of the housing form a single second piece and are nested with like second pieces of other housings like said housing and are stacked atop or below the first pieces, such that said stacked housings are transportable or storable in a compact form.

Preferred embodiments of the invention will now be described by way of reference to the accompanying drawings.

DESCRIPTION OF THE PREFERRED EMBODIMENTS

Figure 1:
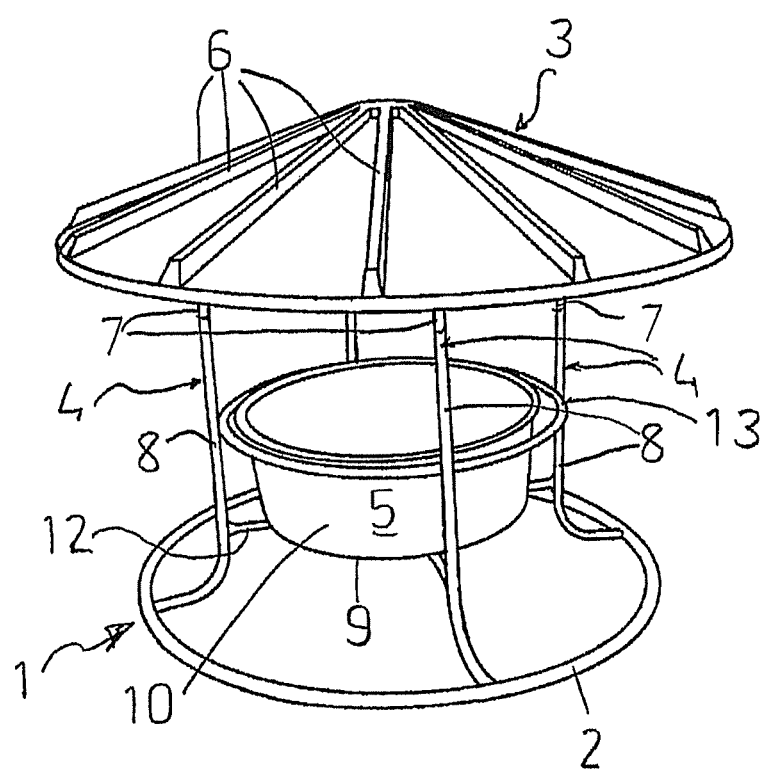
FIG. 1 is a perspective view of a housing for animal feedstuff, according to an embodiment of the invention.

In the drawings like reference numerals refer to like features.

FIG. 1 shows a housing 1 for animal feedstuff configured to feed animals such as cattle. The housing 1 includes a base 2, a roof 3, four uprights 4 and a container 5 for containing feedstuff.

The roof 3 is in the form of a Chinaman's hat that overhangs the base 2. The roof 3 has radially extending ribs 6 (only some of which have been labelled) and a pitch of about 30 degrees. The roof is made of polyethylene.

The base 2 is a circular galvanised pipe. Although not shown in FIG. 1, an annular upright support member consisting of a circular galvanised pipe is connected (welded) to an upper end of each upright 4. The roof 3 is detachably connected to the annular upright support ring by way of U-shaped bolts.

The uprights 4 are of adjustable length such that the roof 3 can be raised or lowered relative to the base 2. Each upright 4 comprises upper 7 and lower 8 telescopic halves. Each upper telescopic half 7 has a vertically extending region and an arcuate region extending outwardly from an end of the vertically extending region to the annular upright support member. Each lower telescopic half 8 has a vertically extending region and an arcuate region extending outwardly from an end of the vertically extending region to the base 2. The uprights 4 are welded to base 2. The upper 7 and lower 8 telescopic halves each consist of a galvanised pipe having a linear portion and an arcuate portion. Each upper telescopic half 7 is slidable within each lower telescopic half 8. Although not shown in FIG. 1, a latch bolt locks the upper and lower telescopic halves 7, 8 together such that the uprights 4 are of the desired length. The latch bolt is extended through aligned openings in the vertically extending regions of the telescopic halves 7, 8.

The container 5 has a base 9, a circular sloping sidewall 10 extending from the base 9, and a rim 11 extending from the sidewall 10. The container is made is of polyethylene.

The housing 1 also includes an X-shaped crosspiece 12 that supports the base 9 of the container 5 above the ground. Each end of crosspiece 12 is detachably connected to an upright 4 by way of a clamp (downee fitting). The container 5 can be raised or lowered relative to the roof 3 by repositioning crosspiece 12 relative to the uprights 4. The crosspiece 12 consists of galvanised metal pipes joined together at one end.

The housing 1 also includes an annular container guard 13 extending between the uprights 4 and adjacent to the rim 11 of the container 5. The guard 13 consists of a circular galvanised pipe. J-shaped bolts (not shown) connect the guard 13 to each upright 4 such that the guard 13 is detachably connected. The guard 13 can prevent the rim 11 of the container 5 from being deformed or destroyed by an animal.

In use, the container 5 is charged with feedstuff by way of spaces between adjacent uprights 4. These spaces also allow cattle to access feed within the container 5. The height of the container 5 and the height of the roof 3 can be adjusted for different sized animals and for optimal protection of the feedstuff from wet weather.

Figure 2:
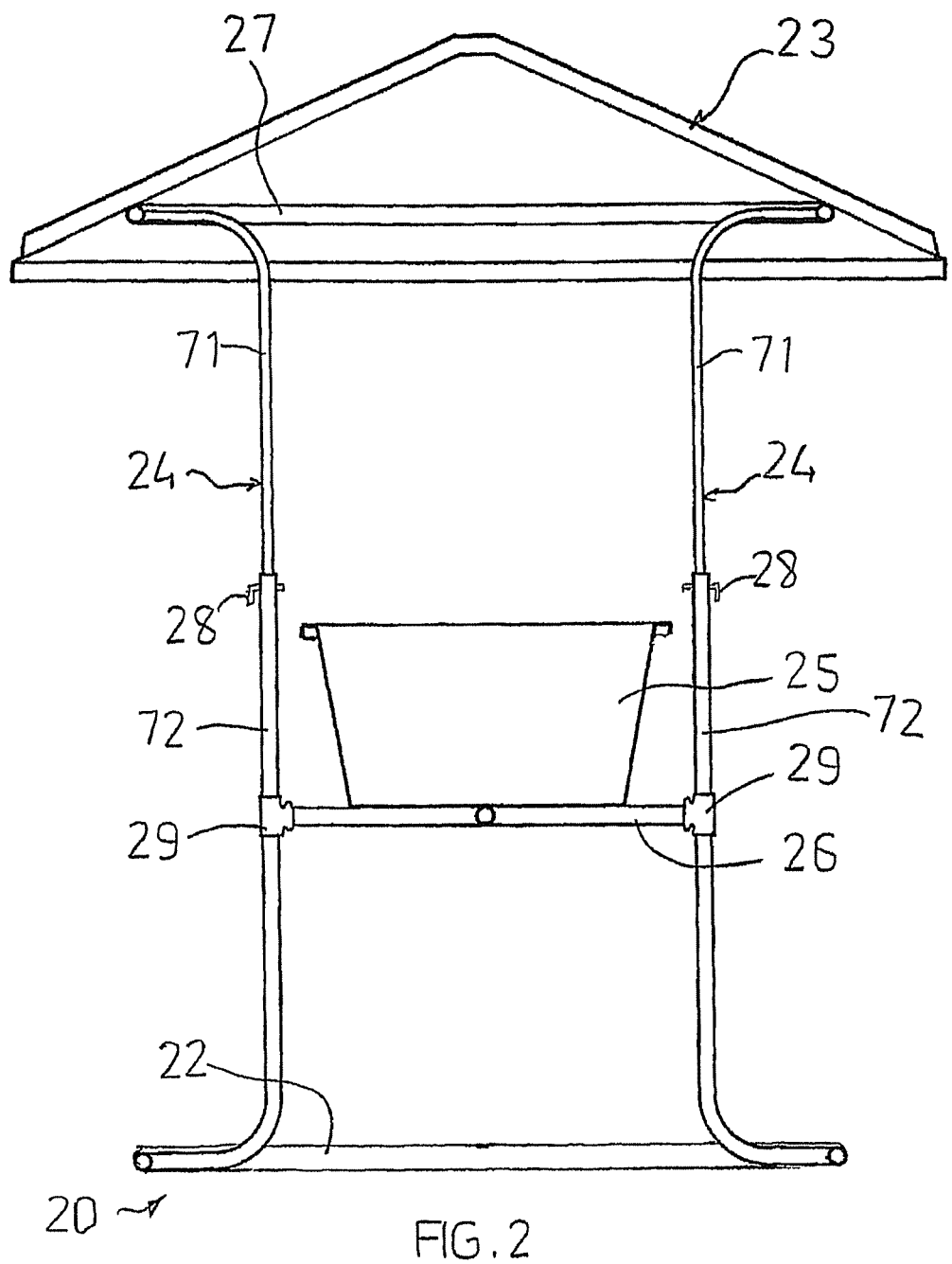
FIG. 2 is a cross sectional view of a housing for animal feedstuff, according to an embodiment of the invention.

FIG. 2 shows a housing 20 for animal feedstuff configured to feed animals such as horses. The housing 20 is almost identical to housing 1 in that it includes a base 22, a roof 23, four telescopic uprights 24, a container 25 and a crosspiece 26. The figure further shows an annular upright support member 27, downee fittings 29 and latch bolts 28 for locking telescopic halves 71, 72 of the uprights 24 together (details which were not shown in FIG. 1).

The housing 20 is configured to feed horses in that the crosspiece 26 and roof 23 are raised relative to housing 1, and housing 20 does not have a guard like guard 13 of housing 1.

Figure 3:
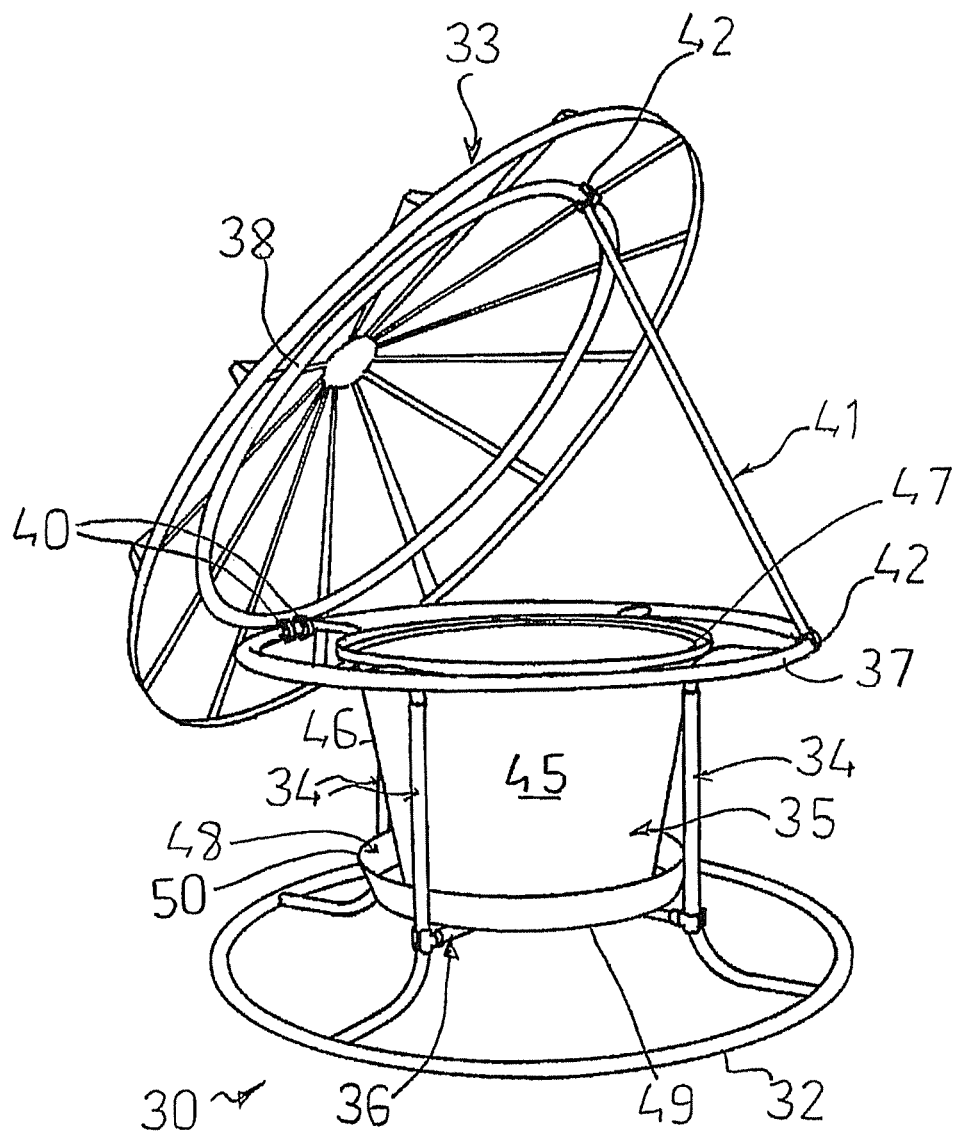
FIG. 3 is a perspective view of a housing for animal feedstuff, according to an embodiment of the invention.
Figure 4:
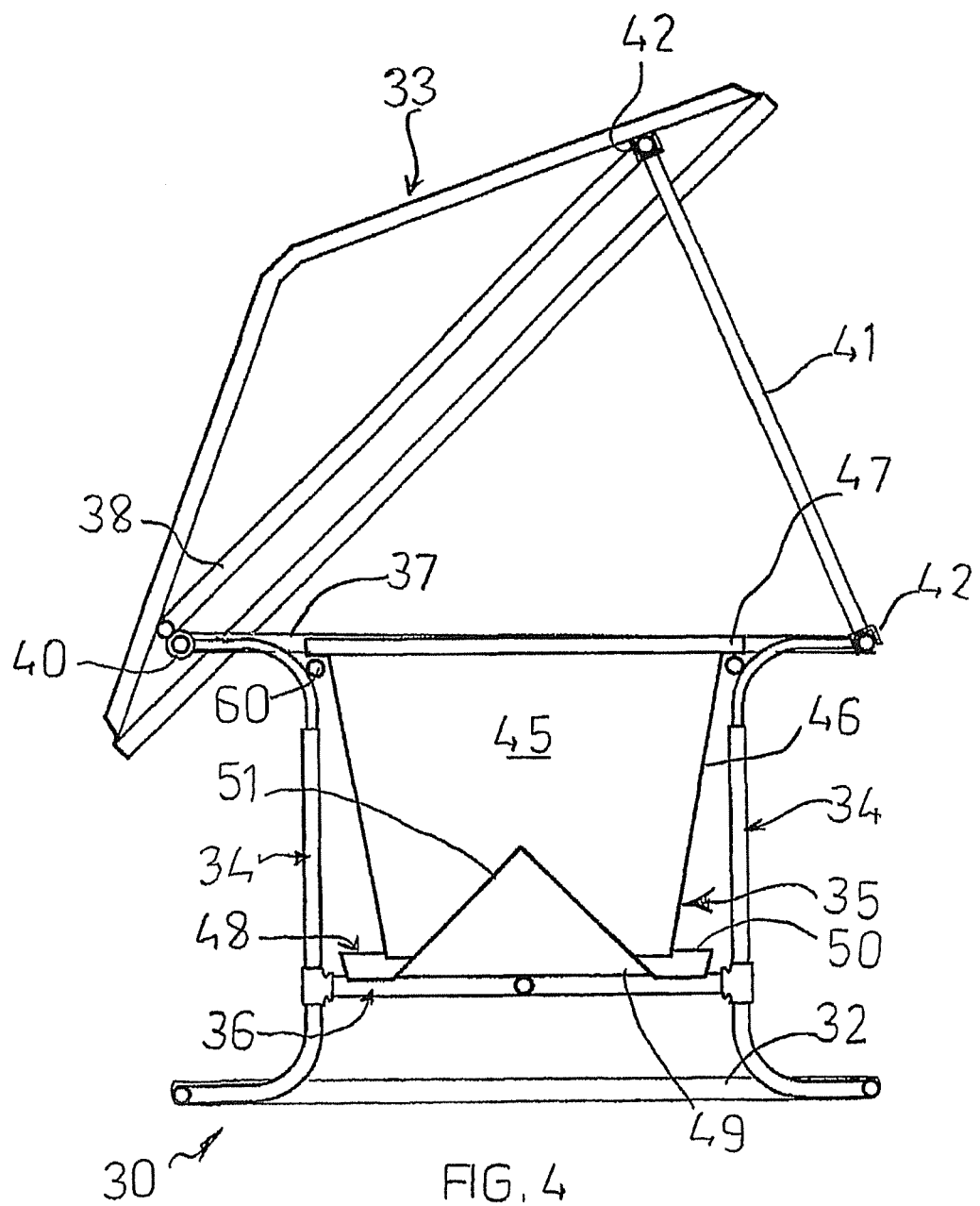
FIG. 4 is a cross sectional view of the housing of FIG. 3.

FIGS. 3 and 4 show a housing 30 for animal feedstuff configured to feed animals such as goats. The housing 30 is very similar to housings 1 and 20. The housing 30 includes a base 32, a roof 33, four telescopic uprights 34, a container 35, a crosspiece 36, and an annular upright support member 37.

The housing 30 further includes an annular roof support member 38 extending beneath the roof 33. The annular roof support member 38 consists of a circular pipe and is connected to the roof 33 by way of U-shaped bolts.

The roof 33 can be pivoted between raised and lowered positions relative to the annular upright support member 37. A pair of metal rings 40 extend from annular roof support member 38 around the annular upright support member 37 to provide the pivoting action.

A prop 41, having a pair of jaws 42 at each end, enables the roof 33 to be held in the raised position, as seen in FIG. 3. One of the jaws 42 engages the annular upright support member 37 and the other jaw 42 engages the annular roof support member 38.

Container 35 differs from containers 5 and 25 in that it is in the form of a pot plant container, and saucer, whereby feedstuff within the pot plant container flows into and fills the saucer. An upper part 45 of the container 35 comprises a circular sloping sidewall 46 and a rim 47 extending therefrom. A lower part 48 of the container 35 is spaced from the upper part 45 and comprises a base 49 having a raised peripheral edge 50 and a conical-shaped central portion 51, as seen in FIG. 4.

The housing 30 further includes an annular container support 16 extending between the uprights 34 and beneath the rim 47. The container support 16 holds upper part 45 above lower part 48 such that feedstuff within upper part 45 can flow under gravity into lower part 48.

In use, the roof 33 is raised and held in place with the prop 41, and the container upper part 45 is charged with feedstuff by way of the space between the roof 33 and the annular upright support member 37.

If desired, housings 1 and 20 can be readily modified such that they also have a pivotable roof, such that their containers 5, 25 can be filled from above in a similar manner.

An advantage of the present invention is that pieces of each housing 1, 20, 30 can be stacked with like pieces of other housings, such that multiple housings can be transported or stored in a compact form. With regard to housing 20, a piece comprising the annular upright support member 27 and half of each upright 7 can be stacked together with like pieces of other housings (after first detaching the roof 23). Another piece comprising the base 22, the crosspiece 26 and the other half 72 of each upright can be stacked together with like pieces of other housings. Moreover, the annular upright support member 27 piece can be inverted and stacked together with the base 22 piece. Like containers 25 can be nested and placed between the uprights 24. The roof 23 can be stacked together with like roofs. The stacked roofs can be inverted and placed on top of the upright halves 72, 71.

With regard to housing 30, a piece comprising the annular upright support member 37, the annular container support 60 and half of each upright can be stacked together with like pieces of other housings (after first detaching annular roof support member 38). Another piece comprising the base 32, the crosspiece 36 and the other half of each upright can be stacked together with like pieces of other housings. Moreover, the annular upright support member 37 piece can be inverted and stacked together with the base 32 piece. The container 35 can be nested with like containers. This can be achieved by nesting the upper part 45 with other like container upper parts, and by nesting the lower part 48 with other like container lower parts. The upper parts 45 can then be placed on the lower parts 48 and the lower parts 48 can be placed between the uprights 34. The roof 33 and annular roof support member 38 can be stacked together with like roofs and members. The stacked roofs and members can be inverted and placed on top of the upright 34 halves.

Figure 5:
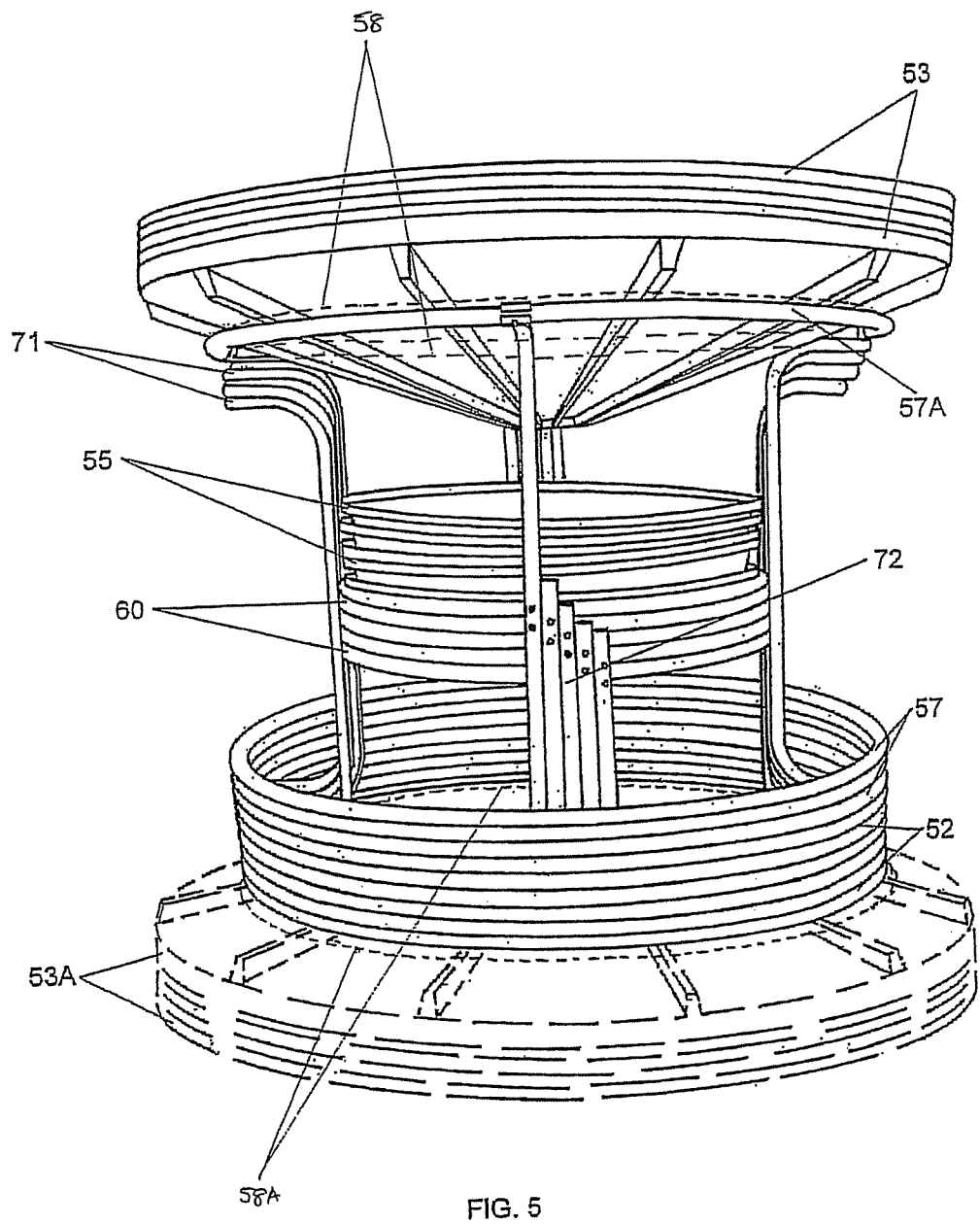
FIG. 5 is a perspective view of a number of housings according to an embodiment of the invention, stacked for transport or storage.
Figure 6:
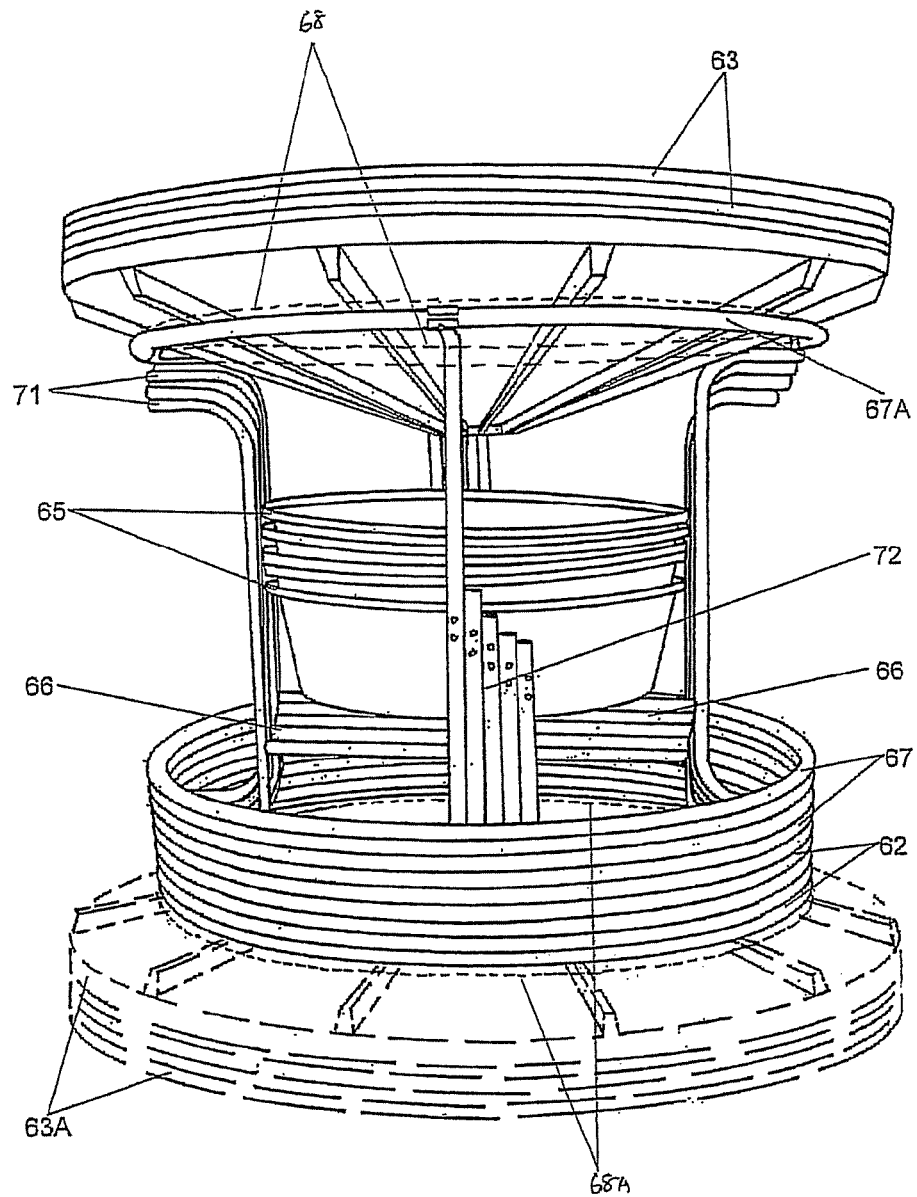
FIG. 6 is a perspective view of a number of housings according to an embodiment of the invention, stacked for transport or storage.

FIGS. 5 and 6 showing housings according to embodiments of the invention stacked in a compact form for transport or storage. In FIG. 5, like first pieces comprising a base 52, lower telescopic half of the uprights 72 and annular container support 60 are stacked together. Like containers 55 are nested and placed on the stacked annular container supports 60. Like second pieces comprising an annular upright support member 57 and upper telescopic half of the uprights 71 are stacked and inverted to stack on the stacked bases 52, except for one piece 57A. Like roofs 53 having annular roof support members 58 are stacked together, then inverted and placed on top of the annular upright support member 57A. The annular roof support members 58 are illustrated in broken lines.

In an alternative manner of stacking pieces of the housings, the stacked first and second pieces and stacked containers 55 can be placed on top of the stacked roofs 53A (shown in broken lines). Only one of the annular roof support members 58A is partially illustrated and it is illustrated in broken lines.

In FIG. 6, like first pieces comprising a base 62, lower telescopic half of the uprights 72 and crosspiece 66 are stacked together. Like containers 65 are nested and placed on the stacked crosspieces 66. Like second pieces comprising an annular upright support member 67 and upper telescopic half of the uprights 71 are stacked and inverted to stack on the stacked bases 62, except for one piece 67A. Like roofs 63 having annular roof support members 68 are stacked together, then inverted and placed on top of the annular upright support member 67A. The annular roof support members 68 are illustrated in broken lines.

In an alternative manner of stacking pieces of the housings, the stacked first and second pieces and stacked containers 65 can be placed on top of the stacked roofs 63A (shown in broken lines). Only one of the annular roof support members 68A is partially illustrated and it is illustrated in broken lines.

Whilst the above has been given by way of illustrative example of the invention, many modifications and variations may be made thereto by persons skilled in the art without departing from the broad scope and ambit of the invention as herein set forth.

The invention claimed is:

1. A housing for animal feedstuff, said housing including:
an annular base;
a cone-shaped roof extending over the base;
an annular roof support member extending beneath the roof and connected to the roof so that the roof is able to maintain its cone shape when the housing is being transported or stored;
tubular uprights spaced apart from one another and connected to the annular base and the annular roof support member such that the roof is pivotable between raised and lowered positions relative to the uprights, wherein each said upright has a vertically extending region having an upper end and a lower end, an arcuate region extending outwardly from the upper end towards the annular roof support member, and an arcuate region extending outwardly from the lower end to the annular base;
a container having a base and being locatable between the uprights for containing feedstuff, wherein an animal accesses feedstuff within the container by way of spaces between the uprights; and
a crosspiece extending between the uprights for supporting the container base above the annular base,
wherein the annular base, crosspiece and uprights when connected to one another as a single first piece are stackable with identical first pieces of other housings identical to said housing such that the crosspieces are in contact with one another, the container is nestable with containers of other housings identical to said housing between the uprights of said first pieces, and the roof together with the annular roof support member are detachable from the uprights as a single second piece and nestable with identical second pieces of other housings identical to said housing and are stackable atop or below the first pieces, such that said housings are transportable or storable in a compact form.

2. The housing of claim 1, wherein said annular base comprises a circular pipe.

3. The housing of claim 1, wherein each said upright comprises at least one pipe.

4. The housing of claim 1, wherein said annular roof support member is a circular pipe.

5. The housing of claim 1, wherein said crosspiece has ends detachably connected to the uprights.

6. The housing of claim 1, wherein said crosspiece comprises a pipe.

7. The housing of claim 1, wherein said container can be raised or lowered relative to the roof by repositioning the crosspiece relative to the uprights.

8. The housing of claim 1, wherein four said uprights are spaced equidistantly around the annular base.

9. The housing of claim 1 further including an annular container support detachably connected to each said upright and extending beneath an upper edge of the container.

10. The housing of claim 9, wherein said annular container support comprises a circular pipe.

11. Two or more housings in stacked conformation, wherein each housing includes:
an annular base;
a cone-shaped roof extending over the base;
an annular roof support member extending beneath the roof and connected to the roof so that the roof is able to maintain its cone shape when the housing is being transported or stored;
tubular uprights spaced apart from one another and connected to the annular base and the annular roof support member such that the roof is pivotable between raised and lowered positions relative to the uprights, wherein each said upright has a vertically extending region having an upper end and a lower end, an arcuate region extending outwardly from the upper end towards the annular roof support member, and an arcuate region extending outwardly from the lower end to the annular base;

a container having a base and being locatable between the uprights for containing feedstuff, wherein an animal accesses feedstuff within the container by way of spaces between the uprights; and a crosspiece extending between the uprights for supporting the container base above the annular base, wherein each annular base, each upright and each annular roof support member is a circular pipe; and wherein the annular base, crosspiece and uprights of a housing are connected to one another as a single first piece and are stacked with identical first pieces of other housings identical to said housing such that the crosspieces are in contact with one another, the container is nested with containers of other housings identical to said housing between the uprights of said first pieces, and the roof together with the annular roof support member of the housing form a single second piece and are nested with identical second pieces of other housings identical to said housing and are stacked atop or below the first pieces, such that said stacked housings are transportable or storable in a compact form.

\* \* \* \* \*